United States Patent
Lee et al.

(10) Patent No.: US 10,340,517 B2
(45) Date of Patent: Jul. 2, 2019

(54) POSITIVE ELECTRODE ACTIVE MATERIAL, METHOD FOR PREPARING THE SAME AND LITHIUM SECONDARY BATTERY INCLUDING THE SAME

(71) Applicant: LG Chem, Ltd., Seoul (KR)

(72) Inventors: Dong Kwon Lee, Daejeon (KR); Seung Beom Cho, Daejeon (KR); Jun Seok Nho, Daejeon (KR); Byung Hyun Min, Daejeon (KR); Bae Jung Kim, Daejeon (KR)

(73) Assignee: LG Chem, Ltd. (KR)

( * ) Notice: Subject to any disclaimer, the term of this patent is extended or adjusted under 35 U.S.C. 154(b) by 43 days.

(21) Appl. No.: 15/531,113

(22) PCT Filed: Dec. 4, 2015

(86) PCT No.: PCT/KR2015/013265
§ 371 (c)(1),
(2) Date: May 26, 2017

(87) PCT Pub. No.: WO2016/089176
PCT Pub. Date: Jun. 9, 2016

(65) Prior Publication Data
US 2017/0271656 A1    Sep. 21, 2017

(30) Foreign Application Priority Data

Dec. 5, 2014   (KR) .................. 10-2014-0174079
Dec. 4, 2015   (KR) .................. 10-2015-0172358

(51) Int. Cl.
H01M 4/36       (2006.01)
H01M 4/505      (2010.01)
(Continued)

(52) U.S. Cl.
CPC ............ *H01M 4/366* (2013.01); *C01G 53/50* (2013.01); *H01M 4/0471* (2013.01);
(Continued)

(58) Field of Classification Search
CPC ...... H01M 4/366; H01M 4/505; H01M 4/525; H01M 4/62; H01M 10/0525; C01G 53/50
(Continued)

(56) References Cited

U.S. PATENT DOCUMENTS 9,972,841 B2 *   5/2018   Kwak .................. H01M 4/483
2009/0186275 A1   7/2009   Exnar et al.
(Continued)

FOREIGN PATENT DOCUMENTS

JP    2001106534 A    4/2001
JP    2006156032 A    6/2006
(Continued)

OTHER PUBLICATIONS

Machine translation of JP 2012-138197 (no date).*
(Continued)

*Primary Examiner* — Amanda C. Walke
(74) *Attorney, Agent, or Firm* — Lerner, David, Littenberg, Krumholz & Mentlik, LLP

(57) ABSTRACT

The present invention provides a positive electrode active material prepared using a preparation method including mixing a precursor of a metal for a positive electrode active material with a nanosol of a ceramic-based ion conductor to adsorb the nanosol of the ceramic-based ion conductor on the precursor surface, and mixing the nanosol of the ceramic-based ion conductor-adsorbed precursor with a lithium raw material, and heat treating the resultant to prepare a positive electrode active material, and thereby having greatly increased structural stability by the lithium complex metal oxide present on the surface as a metal
(Continued)

element forming the ceramic-based ion conductor being uniformly doped, and as a result, capable of significantly enhancing capacity, a rate property and a cycle property of a battery, a method for preparing the same, and a lithium secondary battery including the same.

17 Claims, 4 Drawing Sheets

(51) Int. Cl.
*H01M 4/525* (2010.01)
*H01M 4/62* (2006.01)
*H01M 10/0525* (2010.01)
*C01G 53/00* (2006.01)
*H01M 4/04* (2006.01)
*H01M 4/131* (2010.01)
*H01M 4/1391* (2010.01)
*H01M 10/052* (2010.01)
*H01M 4/02* (2006.01)

(52) U.S. Cl.
CPC ......... *H01M 4/131* (2013.01); *H01M 4/1391* (2013.01); *H01M 4/505* (2013.01); *H01M 4/525* (2013.01); *H01M 4/62* (2013.01); *H01M 10/0525* (2013.01); *C01P 2002/70* (2013.01); *C01P 2004/04* (2013.01); *C01P 2006/40* (2013.01); *H01M 10/052* (2013.01); *H01M 2004/028* (2013.01); *H01M 2220/20* (2013.01); *Y02E 60/122* (2013.01)

(58) Field of Classification Search
USPC ........................................................ 429/223
See application file for complete search history.

(56) References Cited

U.S. PATENT DOCUMENTS

| | | | |
|---|---|---|---|
| 2011/0269018 A1 | 11/2011 | Kono et al. | |
| 2011/0274977 A1* | 11/2011 | Nakura | C01G 53/00 429/223 |
| 2012/0276446 A1 | 11/2012 | Kawai | |
| 2014/0079873 A1 | 3/2014 | Miki et al. | |
| 2014/0087262 A1 | 3/2014 | Imahashi et al. | |
| 2014/0113193 A1 | 4/2014 | Tsunozaki et al. | |
| 2015/0340689 A1 | 11/2015 | Song et al. | |
| 2015/0368163 A1* | 12/2015 | Hao | C01G 51/42 501/1 |
| 2017/0288206 A1* | 10/2017 | Lee | H01M 4/131 |

FOREIGN PATENT DOCUMENTS

| | | | |
|---|---|---|---|
| JP | 2007191354 A | | 8/2007 |
| JP | 2009532323 A | | 9/2009 |
| JP | 2010083682 A | | 4/2010 |
| JP | 2012138197 A | | 7/2012 |
| JP | 2012230898 A | | 11/2012 |
| JP | 2012238581 A | | 12/2012 |
| KR | 20060099314 A | * | 9/2006 |
| KR | 100813014 B1 | | 3/2008 |
| KR | 20120012628 A | | 2/2012 |
| WO | 2009151528 A1 | | 12/2009 |
| WO | 2010147179 A1 | | 12/2010 |
| WO | 2011067898 A1 | | 6/2011 |
| WO | 2012164760 A1 | | 12/2012 |
| WO | 2012176904 A1 | | 12/2012 |

OTHER PUBLICATIONS

Machine translation of KR 2006-0099314 (no date).*
Supplementary European Search Report for Application No. EP15864385, dated Oct. 20, 2017.
Kim, et al., Fabrication and characterization of a YSZ/YDC composite electrolyte by a sol-gel coating method, Journal of Power Sources, Jul. 2002, pp. 222-228, vol. 110, No. 1, Elsevier SA, CH.
Kim, et al., Sol-Gel Processing of Yttria-Stabilized Zirconia Films Derived From the Zirconium N-Butoxide-Acetic Acid-Nitric Acid-Waster-Isopropanol System, Journal of Materials Science, Apr. 2004, pp. 2683-2688, vol. 39, No. 8.
Search Report from International Applicaiton No. PCT/KR2015/013265, dated Apr. 8, 2016.
Fey, George Ting-Kuo, et al., "Thermal and electrochemical behavior of yttria-stabilized zirconia coated LiCoO2, during overcharge tests." Journal of Power Sources, 2009, vol. 189, pp. 837-840.

* cited by examiner

POSITIVE ELECTRODE ACTIVE MATERIAL, METHOD FOR PREPARING THE SAME AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2015/013265, filed Dec. 4, 2015, which claims the benefit of Korean Patent Application No. 10-2014-0174079 filed with the Korean Intellectual Property Office on Dec. 5, 2014, and Korean Patent Application No. 10-2015-0172358, filed with the Korean Intellectual Property Office on Dec. 4, 2015, the entire contents of which are hereby incorporated by reference.

TECHNICAL FIELD

The present invention relates to a positive electrode active material, a method for preparing the same, and a lithium secondary battery including the same.

BACKGROUND

Since their appearances in 1991 as a small, lightweight and high-capacity battery, lithium secondary batteries have been widely used as a power source of portable devices. With recent rapid developments in electronics, communications and computer industries, camcorders, mobile phones, laptops, PCs and the like have appeared and gone through remarkable developments, and demands for secondary batteries as an energy source driving these portable electronics and information communication devices have continuously increased.

However, lithium secondary batteries have a problem in that battery lifespan rapidly decreases as charge and discharge are repeated. Such a problem is particularly more serious at high temperatures and high voltages. This is due to a phenomenon occurring when an electrolyte is decomposed or an active material is degraded due to moisture inside the battery or other influences, or inner resistance of the battery increases.

In view of the above, a positive electrode active material for a lithium secondary battery that has been actively research and developed, and is currently used is a layer-structured $LiCoO_2$. $LiCoO_2$ is most widely used due to its excellent lifespan property and charge and discharge efficiency, but has low structural stability, and therefore, has a limit in the use in technologies enabling batteries to have high capacity.

Various lithium transition metal oxides such as $LiNiO_2$, $LiMnO_2$, $LiMn_2O_4$, $LiFePO_4$ or $Li(Ni_xCoyMnz)O_2$ have been developed as an alternative positive electrode active material. Among these, $LiNiO_2$ has an advantage of exhibiting a battery property of high discharge capacity, but has a problem of being difficult to be synthesized using a simple solid state reaction, and having poor thermal stability and cycle property. In addition, lithium manganese-based oxides such as $LiMnO_2$ or $LiMn_2O_4$ have an advantage of excellent thermal stability and low costs, but have a problem of small capacity and a poor high temperature property. Particularly, some $LiMn_2O_4$ has been commercialized as low-priced products, but does not have a favorable lifespan property due to structural distortion (Jahn-Teller distortion) caused by $Mn^{3+}$. Furthermore, extensive studies have been made on $LiFePO_4$ for application in hybrid electric vehicles (HEV) due to its low costs and excellent stability, however, $LiFePO_4$ is difficult to be used in other fields due to its low conductivity.

Under such circumstances, a material mostly favored as an alternative positive electrode active material for $LiCoO_2$ is $Li(Ni_xCo_yMn_z)O_2$ (herein, x, y and z are each independently an atomic fraction of oxide-forming elements, and $0<x\leq1$, $0<y\leq1$, $0<z\leq1$ and $0<x+y+z\leq1$). This material is less expensive than $LiCoO_2$, and has an advantage of capable of being used under high capacity and high voltage, but has a disadvantage of inferior rate capability and lifespan property at high temperatures.

Accordingly, various attempts to improve thermal stability, a capacity property, a cycle property or the like of a positive electrode active material through methods such as doping materials such as Al, Ti, Sn, Ag or Zn into the positive electrode active material, or dry or wet coating metals having favorable conductivity on a surface of the positive electrode active material have been made, however, the extent of improvement is still insufficient.

Particularly, when a positive electrode active material is doped, the doped materials are present in a uniform concentration in the positive electrode active material, which causes a problem of capacity decline although structural stability of the positive electrode active material is enhanced.

DISCLOSURE OF THE INVENTION

Technical Problem

A first object of the present invention is to provide a method for preparing a positive electrode active material having improved structural stability and capable of enhancing battery properties such as minimizing capacity decline and improving a cycle property when used in a battery by, through using a nanosol of a ceramic-based ion conductor having lithium ion conductivity, uniformly doping a lithium complex metal oxide present on a positive electrode active material particle surface with a metal forming the ceramic-based ion conductor.

A second object of the present invention is to provide a positive electrode active material prepared using the above-mentioned preparation method and thereby having improved structural stability, and accordingly, capable of improving capacity, a rate property and a cycle property of a battery.

A third object of the present invention is to provide a positive electrode including the positive electrode active material.

A fourth object of the present invention is to provide a lithium secondary battery, a battery module and a battery pack including the positive electrode.

Technical Solution

In view of the above, one aspect of the present invention provides a method for preparing a positive electrode active material including mixing a precursor of a metal for a positive electrode active material with a nanosol of a ceramic-based ion conductor to adsorb the nanosol of the ceramic-based ion conductor on the precursor surface, and mixing the nanosol of the ceramic-based ion conductor-adsorbed precursor with a lithium raw material, and heat treating the result to prepare a positive electrode active material including lithium complex metal oxide particles, wherein the lithium complex metal oxide present on a surface side of the lithium complex metal oxide particles is doped with a metal element of the ceramic-based ion conductor.

Another aspect of the present invention provides a positive electrode active material prepared using the above-mentioned preparation method, including lithium complex metal oxide particles, wherein the lithium complex metal oxide present on a surface side of the lithium complex metal oxide particles is doped with a metal element of the ceramic-based ion conductor.

Still another aspect of the present invention provides a positive electrode including the positive electrode active material.

Still another aspect of the present invention provides a lithium secondary battery, a battery module and a battery pack including the positive electrode.

Other specifics of the embodiments of the present invention are described below in the mode for carrying out the invention.

Effects of the Invention

By uniformly doping a lithium complex metal oxide present on a surface as a metal element forming a ceramic-based ion conductor using a nanosol of a ceramic-based ion conductor having lithium ion conductivity when preparing a positive electrode active material including a lithium complex metal oxide, a method for preparing a positive electrode active material according to the present invention is capable of greatly increasing structural stability of a positive electrode active material and thereby more improving capacity, a rate property and a cycle property of a battery compared to doping according to existing dry mixing methods.

BRIEF DESCRIPTION OF THE DRAWINGS

The drawings accompanied in the present specification illustrate preferred embodiments of the present invention, and perform a role of further illuminating technological ideas of the present invention together with the contents of the invention described above, and accordingly, the present invention is not to be interpreted limiting to those described in the drawings.

BEST MODE FOR CARRYING OUT THE INVENTION

Figure 1:
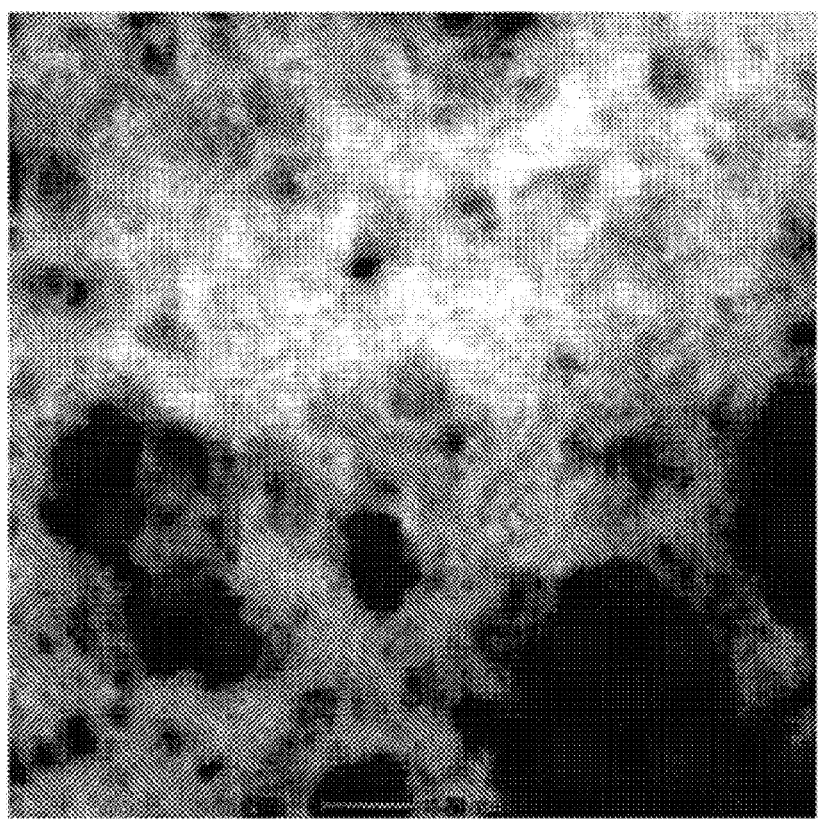
FIG. 1 is a picture observing a nanosol of a ceramic-based ion conductor prepared in Preparation Example 1 using a transmission electron microscopy.

Hereinafter, the present invention will be described in more detail in order to illuminate the present invention. Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

A method for preparing a positive electrode active material according to one embodiment of the present invention includes, mixing a precursor of a metal for a positive electrode active material with a nanosol of a ceramic-based ion conductor to adsorb the nanosol of the ceramic-based ion conductor on the precursor surface (step 1), and mixing the nanosol of the ceramic-based ion conductor-adsorbed precursor with a lithium raw material, and heat treating the resultant to prepare a positive electrode active material including lithium complex metal oxide particles, wherein the lithium complex metal oxide present on a surface side of the lithium complex metal oxide particles is doped with a metal element of the ceramic-based ion conductor (step 2).

Hereinafter, each steps are describes as follows. In the method for preparing a positive electrode active material according to one embodiment of the present invention, the step 1 is a step of preparing a nanosol of a ceramic-based ion conductor-adsorbed precursor by mixing a hydroxide containing a metal for a positive electrode active material as a precursor of a metal for a positive electrode active material with a nanosol of a ceramic-based ion conductor in a solvent.

In the nanosol of the ceramic-based ion conductor, the ceramic-based ion conductor may specifically include at least one of ion conductive ceramic and metal ceramic.

The ion conductive ceramic may specifically include zirconia ($ZrO_2$)-based oxides doped with Y, Ca, Ni or Sc such as yttria-stabilized zirconia (YSZ), calcia-stabilized zirconia (CSZ) or scandia-stabilized zirconia (SSZ); ceria ($CeO_2$)-based oxides doped with Gd, Y or Sm such as gadolinia-doped ceria (GDC), samarium-doped ceria (SDC) or yttria-doped ceria (YDC); lanthanum-based oxides such as lanthanum strontium gallate magnesite (LSGM), lanthanum strontium manganite (LSM) or lanthanum strontium cobalt ferrite (LSCF), and these may be used either alone as one type or as a mixture of two or more types.

In addition, in the ion conductive ceramic, the YSZ is a ceramic material made to be stable even at room temperature by adding a yttrium oxide (yttria) to a zirconium oxide (zirconia). In the YSZ, some of $Zr^{4+}$ ions may be replaced with $Y^{3+}$ by adding yttria to zirconia. Accordingly, the compound is replaced by three $O^{2-}$ ions instead of four $O^{2-}$ ions and as a result, oxygen vacancy may be made. Due to the oxygen vacancy produced as above, YSZ has $O^{2-}$ ion conductivity, and conductivity becomes favorable as a temperature increases. Specifically, the YSZ is $Zr_{(1-x)}Y_xO_{2-x/2}$, and herein, $0.01 \leq x \leq 0.30$ and more specifically $0.08 \leq x \leq 0.10$. Meanwhile, in the present invention, room temperature means a temperature range of 23±5° C. unless particularly defined otherwise.

The CSZ is a ceramic material made to be stable even at room temperature by adding a calcium oxide (calcia) to a zirconium oxide (zirconia), and is capable of enhancing thermal stability of zirconia by adding calcia thereto. The CSZ is a mixed state of a cubic crystal structure and a tetragonal crystal structure. A tetragonal crystal structure changes to a cubic crystal structure when a temperature increases, and changes back to a tetragonal structure when a temperature decreases, and during such a crystal structure changing process, volume expansion and shrinkage may be repeated.

The SSZ is a ceramic material made to be stable even at room temperature by adding a scandium oxide (scandia) to a zirconium oxide (zirconia), and specific examples thereof may include $(ZrO_2)_{1-2x}(Sc_2O_3)_x$, $(ZrO_2)_{1-2x}(Sc_2O)_{3x-z}(Y_2O_3)_z$, $(ZrO_2)_{1-2x-z}(Sc_2O_3)_x(CeO_2)_z$ (herein, $0.01 \leq x \leq 0.2$ and $0.01 \leq z \leq 0.1$) or the like.

The GDC is a gadolinium oxide ($Gd_2O_2$)-doped ceria, and has high ion conductivity like LSGM. Specific examples thereof may include $Gd_{0.1}Ce_{0.9}O_{1.95}$ or the like.

The LSGM is a lanthanum-strontium-gallium-magnesium oxide having high lithium ion conductivity by doping Sr and Mg, and specific examples thereof may include $(La_xSr_{1-x})(Ga_yMg_{1-y})O_{3-\delta}$ ($0.05 \leq x < 1$ and $0.05 \leq y < 1$, $\delta$ may be defined as a value meaning a small deviation from perfect stoichiometry) or the like.

The LSM is lanthanum manganite doping Sr to $LaMnO_3$, and has a manganese-based perovskite structure. Specific examples thereof may include $LaSrMnO$, $La_{(1-x)}Sr_xMnO_3$ ($0.01 \leq x \leq 0.3$), $La_{(1-y)}Sr_yMn_zO_{3-\delta}$ ($0.05 \leq y < 1$, $0.95 \leq z \leq 1.15$, $\delta$ may be defined as a value meaning a small deviation from perfect stoichiometry) or the like.

The LSCF is lanthanum ferrite doping Sr and Co to $LaFeO_3$, and is stable at high temperatures, and has high ion conductivity.

Meanwhile, the metal ceramic is prepared by mixing and sintering ceramic and metal powder, and has both ceramic properties of high heat resistance and high hardness, and metal properties having plastic deformation and electric conductivity. Specifically, in the metal ceramic, the ceramic may be the ion conductive ceramic described above, and the metal may be nickel, molybdenum, cobalt or the like. More specifically, the metal ceramic may be cermet such as nickel-yttria-stabilized zirconia cermet (Ni-YSZ cermet).

In the method for preparing a positive electrode active material according to one embodiment of the present invention, the ceramic-based ion conductor may have a single phase.

In the method for preparing a positive electrode active material according to one embodiment of the present invention, the ceramic-based ion conductor may specifically include any one or a mixture of two or more selected from the group consisting of YSZ, GDC, LSGM, LSM, CSZ, SSZ and Ni—YSZ, and more specifically any one or a mixture of two or more selected from the group consisting of YSZ, GDC, LSGM, SSZ and CSZ.

In the method for preparing a positive electrode active material according to one embodiment of the present invention, the ceramic-based ion conductor may include YSZ, and the YSZ may be $Zr_{(1-x)}Y_xO_{2-x/2}$ (herein, $0.01 \leq x \leq 0.30$ and more specifically $0.08 \leq x \leq 0.10$).

In the method for preparing a positive electrode active material according to one embodiment of the present invention, the ceramic-based ion conductor may include SSZ, and may include SSZ selected from the group consisting of $(ZrO_2)_{1-2x}(Sc_2O_3)_x$, $(ZrO_2)_{1-2x}(Sc_2O)_{3x-z}(Y_2O_3)_z$, $(ZrO_2)_{1-2x-z}(Sc_2O_3)_x(CeO_2)_z$ (herein, $0.01 \leq x \leq 0.2$ and $0.01 \leq z \leq 0.1$) and a mixture thereof.

In the method for preparing a positive electrode active material according to one embodiment of the present invention, the ceramic-based ion conductor may include CSZ having CaO content in 1 mol % to 20 mol % and more specifically in 2 mol % to 17 mol % in the total CSZ weight.

In the method for preparing a positive electrode active material according to one embodiment of the present invention, the ceramic-based ion conductor may have an average particle diameter ($D_{50}$) of 1 nm to 100 nm. When having an average particle diameter in the above-mentioned range, uniform dispersion may be obtained in a sol. More specifically, the ceramic-based ion conductor may have an average particle diameter ($D_{50}$) of 1 nm to 50 nm and more specifically 1 nm to 5 nm.

In the present invention, the average particle diameter ($D_{50}$) of the ceramic-based ion conductor may be defined as a particle diameter at a 50% base in the particle diameter distribution. The average particle diameter ($D_{50}$) of the particles according to one embodiment of the present invention may be measured using a laser diffraction method. Generally, the laser diffraction method is capable of measuring a particle diameter from a submicron region to a few mm approximately, and results of high reproducibility and high resolution are capable of being obtained. For example, as the method of measuring an average particle diameter ($D_{50}$) of the YSZ, a nanosol of the YSZ is introduced to a commercially available laser diffraction particle size analyzer (for example, Microtrac MT 3000) and irradiated with ultrasonic waves of approximately 28 kHz with an output of 60 W, and the average particle diameter ($D_{50}$) at a 50% base in the particle diameter distribution in the measuring device may be calculated.

In addition, in the method for preparing a positive electrode active material according to one embodiment of the present invention, the amount of the nanosol of the ceramic-based ion conductor used may be properly selected depending on the content of a ceramic-based ion conductor-derived metal element doped to a lithium transition metal oxide in a finally prepared positive electrode active material. Specifically, in the nanosol of the ceramic-based ion conductor, the content of the ceramic-based ion conductor-derived metal in a finally prepared positive electrode active material may be from 50 ppm to 300,000 ppm and more specifically from 100 ppm to 10,000 ppm to the total weight of the positive electrode active material.

In the method for preparing a positive electrode active material according to one embodiment of the present invention, the nanosol of the ceramic-based ion conductor may be prepared by dissolving a precursor of a metal for forming a ceramic-based ion conductor in a glycol-based solvent, and then hydrating the result by adding water thereto.

A dispersion liquid prepared by dispersing ceramic-based ion conductor powder in a nanoparticle state in a solvent according to common methods does not exhibit lithium ion conductivity since the ceramic-based ion conductor is crystalline, and has very low reactivity for lithium as well. Accordingly, uniform doping is difficult to be accomplished when doping to an active material surface. On the contrary, when preparing a nanosol of a ceramic-based ion conductor through a reaction of a precursor of a metal for forming a ceramic-based ion conductor as described above, a ceramic-based ion conductor in a hydroxide form having nano-level particle sizes, noncrystalline, and having a hydroxyl group on the surface is formed. Such a ceramic-based ion conductor not only exhibits lithium ion conductivity itself, but has excellent reactivity with lithium, and consequently, uniform and highly efficient doping to a lithium complex metal oxide is capable of being accomplished in a finally prepared active material.

The glycol-based solvent capable of being used in the nanosol preparation is a dihydric alcohol having 2 hydroxyl groups in the molecule, and specific examples thereof may include ethylene glycol, propylene glycol, diethylene glycol, triethylene glycol, polyethylene glycol or the like, and any one or a mixture of two or more of these may be used.

In addition, as the precursor of the metal for forming a ceramic-based ion conductor may include a compound containing a metal for forming a ceramic-based ion conductor, and specifically, may include hydroxides, oxyhydroxides, alkoxides, carbonates, acetates, oxalates, citrates, nitrates, nitrides, sulfates, sulfides, halogenides, or hydrates thereof, and any one or a mixture of two or more of these may be used. The metal for forming a ceramic-based ion conductor may be a metal forming the ceramic-based ion conductor, and specific examples thereof may include one or more types of elements selected from the group consisting of rare-earth elements such as Y, Sc, Gd, Sm, Ce or La; and Zr, or a mixed element of these elements and one or more types of elements selected from the group consisting of alkali earth metal elements such as Ca, Mg or Sr; transition metals such as Mg, Co or Fe; and post transition metals such as Ga. As one example, a precursor of YSZ may use zirconium dinitrate dihydrate ($ZrO(NO_3)_2.2H_2O$) as a Zr-including raw material and yttrium nitrate hexahydrate $Y(NO_3)_3.6H_2O$ as a Y-including raw material.

In addition, additives such as a chelating agent, a pH controlling agent or a dispersion agent may be further added when preparing the nanosol in order to increase solubility of the precursor of the metal for forming a ceramic-based ion conductor, and increasing dispersibility of the prepared ceramic-based ion conductor.

Specific examples of the pH controlling agent may include organic acids such as acetic acid, citric acid, lactic acid and formic acid, or basic compounds such as ammonia, and the pH controlling agent may be included in an amount to make the nanosol to have a pH of 6.5 to 8.

The dispersion agent may be specifically a polymer dispersion agent or a surfactant, and may be included in 1 part by weight or less, or in 0.1 parts by weight to 0.5 parts by weight to 100 parts by weight of the ceramic-based ion conductor.

In addition, in the nanosol preparation, a stirring or heat treating process may be selectively further carried out in order to increase solubility when the precursor of the metal for forming a ceramic-based ion conductor is dissolved in a glycol-based solvent. The stirring may be carried out using common mixing processes.

The heat treating process may be carried out at a temperature greater than or equal to 120° C. and less than or equal to a boiling point of a glycol-based solvent, and specifically, may be carried out at 120° C. to 300° C., more specifically at 120° C. to 200° C. and more specifically at 120° C. to 180° C.

In addition, after the heat treating process, a cooling process may be further carried out as necessary, and herein, the cooling process may be carried out using common methods such as natural cooling or cold air cooling.

During such a process dissolving the precursor of the metal for forming a ceramic-based ion conductor, a nanoparticle-level noncrystalline ceramic-based ion conductor is produced from a reaction between the precursors.

After that, a hydration reaction using water may be carried out for the resultantly obtained reaction material including the ceramic-based ion conductor. Herein, water; or a mixed solvent of water and a hydroxyl group-including solvent may be used, and specific examples of the hydroxyl group-including solvent may include alcohol (for example, methanol, ethanol, 1-propanol, 2-propanol and the like), polyol (for example, ethylene glycol, propylene glycol, diethylene glycol, dipropylene glycol, polyethylene glycol, butanediol, glycerin and the like) or the like, and any one or a mixture of two or more of these may be used.

The hydration reaction may have excellent reactivity for lithium by water molecules binding to the ceramic-based ion conductor, and uniform and highly efficient doping to a lithium complex metal oxide in a finally prepared active material is capable of being accomplished.

Meanwhile, in the method for preparing a positive electrode active material according to one embodiment of the present invention, a nanosol of any one or a mixed metal of two or more selected from the group consisting of aluminum (Al), niobium (Nb), titanium (Ti), tungsten (W), molybdenum (Mo), chromium (Cr), copper (Cu), vanadium (V) and zinc (Zn) may be further used together with the nanosol of the ceramic-based ion conductor.

Like the ceramic-based ion conductor, the above-mentioned metals are doped into a lithium complex metal oxide present on a surface of a finally prepared positive electrode active material, and are capable of further enhancing structural stability of the positive electrode active material. It may be preferable that the amount of such a nanosol of a metal used be properly selected depending on the content of the metal doped to a lithium complex metal oxide in a finally prepared positive electrode active material. Specifically, in the nanosol of the metal, the metal derived from the nanosol of the metal in a finally prepared positive electrode active material may be used in an amount of 50 ppm to 300,000 ppm and more specifically 100 ppm to 10,000 ppm to the total weight of the positive electrode active material.

Like the preparation of the nanosol of the ceramic-based ion conductor described above, the nanosol of the metal may be prepared by preparing a metal nanosol by dissolving and reacting a precursor of a metal in a glycol-based solvent, and then hydrating the resultant by adding water thereto.

The precursor of the metal may include a compound including any one or a mixed metal of two or more selected from the group consisting of aluminum (Al), niobium (Nb), titanium (Ti), tungsten (W), molybdenum (Mo), chromium (Cr), copper (Cu), vanadium (V) and zinc (Zn). Specifically, hydroxides, oxyhydroxides, alkoxides, carbonates, acetates, oxalates, citrates, nitrates, nitrides, sulfates, sulfides, halogenides, or hydrates thereof, may be included, and any one or a mixture of two or more of these may be used.

In addition, in the method for preparing a positive electrode active material according to one embodiment of the present invention, the precursor of the metal for a positive electrode active material reacting with the nanosol is a material capable of forming a lithium complex metal oxide capable of reversible lithium intercalation and deintercarlation, and may be specifically a hydroxide containing a metal for a positive electrode active material.

The hydroxide containing a metal for a positive electrode active material may be prepared by adding an ammonium cation-containing complex forming agent and a basic compound to an aqueous solution of a raw material containing the metal for a positive electrode active material, and coprecipitating the resultant.

The raw material containing the metal for forming a positive electrode active material may be determined depending on the composition of a lithium complex metal oxide forming a target active material. Specifically, hydroxides, oxyhydroxides, nitrates, halogenides, carbonates, acetates, oxalates, citrates, sulfates or the like including a metal forming the lithium complex metal oxide may be used. In addition, the metal for a positive electrode active material may be any one or a mixed metal of two or more selected from the group consisting of Fe, Ni, Co, Mn, Cr, Zr, Nb, Cu, V, Mo, Ti, Zn, Al, Ga and Mg, and more specifically any one or a mixed metal of two or more selected from the group consisting of Ni, Co, and Mn.

Specifically, when the positive electrode active material includes a lithium-nickel-cobalt-manganese-based compound as a lithium complex metal compound, a nickel (Ni)-containing raw material, a cobalt (Co)-containing raw material and a manganese (Mn)-containing raw material may be used as a raw material for preparing a hydroxide containing the metal for a positive electrode active material. In addition, $Co(OH)_2$, CoO, CoOOH, $Co(OCOCH_3)_2 \cdot 4H_2O$, $Co(NO_3)_2 \cdot 6H_2O$, $Co(SO_4)_2 \cdot 7H_2O$, or the like may be specifically used as the Co-containing raw material, any one or a mixture of two or more of the above-mentioned compounds may be used.

Furthermore, the raw material containing the metal for a positive electrode active material may be preferably used in a proper content ratio considering the content of the metals in a lithium complex metal oxide in a finally prepared positive electrode active material.

In addition, the raw material containing the metal for a positive electrode active material may be used as an aqueous solution by being dissolved in water; or a mixture of water and an organic solvent uniformly mixable with water (specifically alcohol and the like).

Specific examples of the ammonium cation-containing complex forming agent capable of being used in preparing the hydroxide containing the metal for a positive electrode active material may include $NH_4OH$, $(NH_4)_2SO_4$, $NH_4NO_3$, $NH_4Cl$, $CH_3COONH_4$, $NH_4CO_3$ or the like, and any one or a mixture of two or more of these may be used. In addition, the ammonium cation-containing complex forming agent may be used in an aqueous solution form, and herein, water; or a mixture of water and an organic solvent uniformly mixable with water (specifically alcohol and the like) may be used as a solvent.

In addition, the basic compound capable of being used in preparing the hydroxide containing the metal for a positive electrode active material may be alkali metal or alkali earth metal hydroxides such as NaOH, KOH, or $Ca(OH)_2$, or hydrates thereof, and any one or a mixture of two or more of these may be used. The basic compound may also be used in an aqueous solution form, and herein, water, or a mixture of water and an organic solvent uniformly mixable with water (specifically alcohol and the like) may be used as a solvent.

In addition, the coprecipitation reaction for forming particles of the hydroxide containing the metal for a positive electrode active material may be carried out under a condition in which a pH of an aqueous solution of a metal-containing raw material is from 8 to 12. For this, it is preferable that the added amounts of the ammonium cation-containing complex forming agent and the basic compound be properly controlled. Herein, the pH value means a pH value at a liquid temperature of 25° C. In addition, the coprecipitation reaction may be carried out under inert atmosphere at a temperature of 30° C. to 60° C. As a result of such a coprecipitation reaction, particles of a hydroxide containing a metal for a positive electrode active material are produced as a precursor and precipitated in an aqueous solution.

Next, a nanosol of a ceramic-based ion conductor is introduced to the aqueous solution in which particles of the hydroxide containing the metal for a positive electrode active material are precipitated, and a mixing process is carried out.

The mixing process of the nanosol of the ceramic-based ion conductor and the precursor may be carried out through dispersion treatment using a ball mill, a beads mill, a high pressure homogenizer, a high speed homogenizer, an ultrasonic dispersion apparatus or the like. Using such a mixing process, the nanosol of the ceramic-based ion conductor is adsorbed to the precursor.

In the present invention, adsorption means a precursor component being present on a surface of a nanosol of a ceramic-based ion conductor in a higher concentration than surroundings through a physical or chemical binding.

After that, separation and drying processes for the nanosol of the ceramic-based ion conductor-adsorbed precursor prepared in the step 1 may be further carried out selectively. The separation and drying processes may be carried out using common methods.

Next, in the method for preparing a positive electrode active material according to one embodiment of the present invention, the step 2 is a step of mixing the precursor having the nanosol of the ceramic-based ion conductor adsorbed on the surface prepared in the step 1 with a lithium raw material and heat treating the resultant to prepare a positive electrode active material.

Specific examples of the lithium raw material may include hydroxides, oxyhydroxides, nitrates, halogenides, carbonates, acetates, oxalates, citrates or the like including lithium. More specifically, compounds of any one, two or more selected from the group consisting of $Li_2CO_3$, $LiNO_3$, $LiNO_2$, LiOH, $LiOH \cdot H_2O$, LiH, LiF, LiCl, LiBr, LiI, $CH_3COOLi$, $Li_2O$, $Li_2SO_4$, $CH_3COOLi$ and $Li_3C_6H_5O_7$ may be used as the lithium raw material. The amount of the lithium raw material used may be determined depending on the lithium content in a finally prepared lithium transition metal oxide.

The mixing of the precursor having the nanosol of the ceramic-based ion conductor adsorbed on the surface and the lithium raw material may also be carried out through dispersion treatment using a ball mill, a beads mill, a high pressure homogenizer, a high speed homogenizer, an ultrasonic dispersion apparatus or the like.

In addition, in the method for preparing a positive electrode active material according to one embodiment of the present invention, the heat treatment for the mixture of the precursor having the nanosol of the ceramic-based ion conductor adsorbed on the surface and the lithium raw material may be carried out at a temperature of 700° C. to 950° C. When the heat treatment temperature is lower than 700° C., there is concern for a decrease in discharge capacity per unit weight, decline in a cycle property and a decrease in an operating voltage due to the remaining of unreacted raw materials, and when the temperature is higher than 950° C., there is concern for a decrease in discharge capacity per unit weight, decline in a cycle property and a decrease in an operating voltage due to the production of side reaction materials.

In addition, the heat treatment may be carried out under air atmosphere or oxygen atmosphere, and carried out for 5 hours to 30 hours. When the heat treatment is carried out under such a condition, a diffusion reaction between particles of the mixture may be sufficiently obtained.

As a result of the step 2, a positive electrode active material including lithium complex metal oxide particles, wherein the lithium complex metal oxide present on a surface side of the particles is doped with a metal element derived from the ceramic-based ion conductor is prepared.

The positive electrode active material prepared using such a preparation method has greatly enhanced structural stability compared to doping using existing dry mixing methods by a metal derived from a ceramic-based ion conductor including Zr being very uniformly doped to the lithium complex metal oxide present on a surface side of active material particles, and as a result, capacity decline may be minimized when used in a battery. At the same time, an output property, a rate property and a cycle property may be further enhanced.

Accordingly, another embodiment of the present invention provides a positive electrode active material prepared using the above-mentioned preparation method.

Specifically, the positive electrode active material includes lithium complex metal oxide particles, and the lithium complex metal oxide present on a surface side of the particles is doped with a metal element of the ceramic-based ion conductor.

In the present invention, a 'surface side' of lithium complex metal oxide particles means a region close to a surface excluding a center of the particle, and specifically, means a region corresponding to a distance of greater than or equal to 0% and less than 100% from a particle surface, more specifically a distance of 0% to 50% from a particle surface and even more specifically a distance of 0% to 30% from a particle surface, to a distance from a surface to a center of lithium complex metal oxide particles, that is, a radius of a lithium complex metal oxide.

More specifically, the lithium complex metal oxide doped with a metal element of the ceramic-based ion conductor may be a compound of the following Chemical Formula 1:

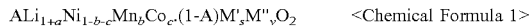

ALi$_{1+a}$Ni$_{1-b-c}$Mn$_b$Co$_c$(1-A)M'$_s$M"$_v$O$_2$       <Chemical Formula 1>

In Chemical Formula 1, M' is a metal element derived from a ceramic-based ion conductor, and specific examples thereof may include any one selected from the group consisting of Y, Zr, La, Sr, Ga, Mg, Sc, Gd, Sm, Ca, Ce, Co, Mn and Fe, or a mixed element of two or more of these, more specifically any one or a mixed element of two or more selected from the group consisting of Y, Zr, La, Sr, Ga, Sc, Gd, Sm and Ce, and even more specifically at least any one element selected from the group consisting of Y and Zr.

In addition, in Chemical Formula 1, M" is derived from a metal nanosol that may be selectively included in the nanosol, and specific examples thereof may include any one or a mixed element of two or more selected from the group consisting of Al, Nb, Ti, W, Mo, Cr, Cu, V and Zn, and more specifically any one or a mixed element of two or more selected from the group consisting of Al, Nb and Ti.

Furthermore, in Chemical Formula 1, 0<A<1, 0≤a≤0.33, 0≤b≤0.5, 0≤c≤0.5, 0<s≤0.2 and 0≤v≤0.2, more specifically 0≤a≤0.09 and even more specifically 0.9<A<1 and a=0. When a is greater than 0.33 in Chemical Formula 1, a difference in a lifespan property effect of doping a ceramic-based ion conductor to lithium complex metal oxide particles may not be significant with approximately 10% or less compared to doping a metal element using common doping methods. When a is 0.09 or less, and particularly 0 in Chemical Formula 1, a difference in the lifespan property effect of doping a ceramic-based ion conductor to lithium complex metal oxide particles may be significant with up to 30% to 70% compared to doping a metal element using common doping methods.

In addition, in Chemical Formula 1, M' and M" may be each independently distributed in a concentration gradient gradually decreasing from a particle surface to a center in lithium complex metal oxide particles. By the concentration of the doped metal being distributed in a concentration gradient gradually changing depending on the location in positive electrode active material particles, a sharp phase boundary area does not exist in the active material, and as a result, crystal structures become stabilized and thermal stability increases. Furthermore, when a concentration gradient in which the doped elements are distributed in high concentrations on a surface side of active material particles and the concentrations gradient decrease closer to a particle center is included, capacity decline may be prevented while exhibiting thermal stability.

Specifically, in the positive electrode active material according to one embodiment of the present invention, when the concentrations of the doped elements M' and M" show a concentration gradient, a concentration difference in M' may be from 10 atom % to 90 atom %, and a concentration difference in M" may be from 10 atom % to 90 atom % in a region of 10 volume % or less from a particle center (hereinafter, simply referred to as 'Rc$_{10}$ region') and in a region of 10 volume % or less from a particle surface (hereinafter, simply referred to as 'Rs$_{10}$ region'), based on the total atomic weight of each doped element M' and M" included in the positive electrode active material.

In the present invention, the concentration gradient structure and the concentration of the doped element in the positive electrode active material particles may be identified using methods such as an Electron Probe Micro Analyzer (EPMA), an Inductively Coupled Plasma-Atomic Emission Spectrometer (ICP-AES) or a Time of Flight Secondary Ion Mass Spectrometry (ToF-SIMS), and specifically, an atomic ratio of each metal may be measured using an EPMA while moving the EPMA from a center to a surface of the positive electrode active material.

In addition, in the positive electrode active material according to one embodiment of the present invention, a lithium complex metal oxide on the active material surface is capable of being uniformly doped with a metal element derived from a ceramic-based ion conductor, and selectively with a metal element derived from a metal nanosol due to a characteristic preparation method using a nanosol and therefore, a surface treating layer formed with the lithium complex metal oxide of Chemical Formula 1 may be further included. The surface treating layer may be formed on a surface of the lithium complex metal oxide particles in a thickness ratio of 0.001 to 0.1 to the radius of the lithium complex metal oxide particles, and more specifically, may be formed in a thickness range of 1 nm to 1000 nm.

Furthermore, in the positive electrode active material according to one embodiment of the present invention, the lithium complex metal oxide may include a compound of the following Chemical Formula 2:

Li$_{1+a}$Ni$_{1-b-c}$Mn$_b$Co$_c$O$_2$       <Chemical Formula 2>

In the formula, 0≤a≤0.33, 0≤b≤0.5 and 0≤c≤0.5.

More specifically, the lithium complex metal oxide may include any one or a mixture of two or more selected from the group consisting of LiCoO$_2$, LiMnO$_2$, LiMn$_2$O$_4$, LiNiO$_2$ and a lithium nickel manganese cobalt oxide (for example, Li(Ni$_{0.6}$Mn$_{0.2}$Co$_{0.2}$)O$_2$, LiNi$_{0.5}$Mn$_{0.3}$Co$_{0.2}$O$_2$, LiNi$_{0.8}$Mn$_{0.1}$Co$_{0.1}$O$_2$ or the like) in terms of enhancing a capacity property and stability of a battery, and more specifically, may include a lithium nickel manganese cobalt oxide.

The positive electrode active material according to one embodiment of the present invention may have an average particle diameter (D$_{50}$) of 3 μm to 30 μm, and more specifically, the positive electrode active material may have an average particle diameter (D$_{50}$) of 5 μm to 10 μm considering rate property and initial capacity property improving effects of a battery from optimization of a specific surface area and positive electrode mixture density.

The positive electrode active material according to one embodiment of the present invention may be primary particles of a lithium complex metal oxide, or secondary particles formed from an assembly of the primary particles. When the positive electrode active material is primary particles of a lithium complex metal oxide, generation of surface impurities such as $Li_2CO_3$ and LiOH caused by reactions with moisture or $CO_2$ in air is reduced, which leads to little concern for battery capacity decline and gas generation, and excellent high temperature stability may also be obtained. In addition, when the positive electrode active material is secondary particles formed from an assembly of primary particles, an output property may be more superior. In the case of secondary particles, the primary particles may have an average particle diameter ($D_{50}$) of 10 nm to 200 nm. Such an active material particle form may be properly determined depending on the composition of a lithium complex metal oxide forming an active material.

Still another embodiment of the present invention provides a positive electrode including the positive electrode active material prepared using the above-mentioned preparation method.

The positive electrode may be prepared using common positive electrode preparation methods known in the art except that the above-mentioned positive electrode active material is used. For example, the positive electrode may be prepared by mixing a solvent, and as necessary, a binder, a conductor or a dispersion agent to the positive electrode active material, and stirring the resultant to prepare slurry, and then applying (coating) the resultant on a positive electrode collector and drying the resultant to form a positive electrode active material layer.

The positive electrode collector is a metal having high conductivity, and is not particularly limited in the use as long as it is a metal to which slurry of the positive electrode active material readily adheres and having no reactivity in a voltage range of a battery. Nonlimiting examples of the positive electrode collector include aluminum, nickel or foil prepared from combinations thereof.

Examples of a solvent for forming the positive electrode include organic solvents such as N-methyl pyrrolidone (NMP), dimethylformamide (DMF), acetone and dimethyl acetamide, or water, and these solvents may be used either alone or as a mixture of two or more types. The amount of the solvent used is sufficient when it is capable of dissolving and dispersing the positive electrode active material, a binder and a conductor considering a slurry coating thickness and a preparation yield.

As the binder, various types of binder polymers such as a vinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, fluorine rubber, polyacrylic acid and polymers substituting hydrogens thereof with Li, Na, Ca or the like, or various copolymers may be used. The binder may be included in 1% by weight to 30% by weight to the total weight of the positive electrode active material layer.

The conductor is not particularly limited as long as it has conductivity without causing chemical changes in the corresponding battery, and examples thereof may include graphite such as natural graphite or artificial graphite; carbon-based materials such as carbon black, acetylene black, Ketjen black, channel black, furnace black, lamp black, thermal black, carbon nanotubes or carbon fiber; metal powder or metal fiber of copper, nickel, aluminum or silver; conductive whiskers such as fluorocarbon, zinc oxide or potassium titanate; conductive metal oxides such as titanium oxide; conductive polymers such as polyphenylene derivatives, or the like, and any one or a mixture of two or more of these may be used. The conductor may be included in 1% by weight to 30% by weight to the total weight of the positive electrode active material layer.

Still another embodiment of the present invention provides a lithium secondary battery including the positive electrode active material prepared using the above-mentioned preparation method.

The lithium secondary battery specifically includes the positive electrode, a negative electrode, and a separator provided between the positive electrode and the negative electrode.

As a negative electrode active material used in the negative electrode, carbon materials capable of absorbing and releasing lithium ions, lithium metal, silicon, tin or the like may be commonly used. Carbon materials are preferably used, and both low crystalline carbon and high crystalline carbon may be used as the carbon material. Low crystalline carbon typically includes soft carbon and hard carbon, and high crystalline carbon typically includes natural graphite, Kish graphite, pyrolytic carbon, mesophase pitch based carbon fiber, meso-carbon microbeads, mesophase pitches and high-temperature baked carbon such as petroleum or coal tar pitch derived cokes. In addition, the negative electrode collector is generally made to a thickness of 3 μm to 500 μm. Such a negative electrode collector is not particularly limited as long as it has conductivity without inducing chemical changes in the corresponding battery, and examples thereof may include copper, stainless steel, aluminum, nickel, titanium, baked carbon, copper or stainless steel of which surface is treated with carbon, nickel, titanium, silver or the like, an aluminum-cadmium alloy, or the like. Like the positive electrode collector, adhesion of the negative electrode active material may increase by forming a fine concavo-convex on the surface, and various forms such as films, sheets, foil, nets, porous materials, foams and non-woven fabrics may be used.

Like the positive electrode, those commonly used in the art may be used as the binder and the conductor used in the negative electrode. The negative electrode may be prepared from preparing negative electrode active material slurry by mixing and stirring the negative electrode active material and the additives, applying the slurry on the collector, and then compressing the resultant.

In addition, as the separator, common porous polymer films that have been used as a separator in the art, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The electrolyte used in the present invention may include an organic-based liquid electrolyte, an inorganic-based liquid electrolyte, a solid polymer electrolyte, a gel-type polymer electrolyte, a solid inorganic electrolyte, a melting inorganic electrolyte and the like capable of being used in manufacturing lithium secondary batteries, but is not limited thereto.

As a lithium salt that may be included as the electrolyte used in the present invention, those commonly used as an electrolyte for lithium secondary batteries may be used without limit, and examples of an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The lithium secondary battery having such a constitution may be manufactured from preparing an electrode assembly by providing a separator between a positive electrode and a negative electrode, placing the electrode assembly inside a case, and then injecting an electrolyte into the case.

The lithium secondary battery including the positive electrode active material according to the present invention as above stably exhibits excellent discharge capacity, an output property and a capacity retention rate, therefore, is useful in the field of portable devices such as mobile phones, laptop computers and digital cameras, and the field of electric vehicles such as hybrid electric vehicles, and the like.

Accordingly, still another embodiment of the present invention provides a battery module including the lithium secondary battery as a unit cell, and a battery pack including the same.

The battery module or the battery pack may be used as a power supply of a medium to large sized device of any one or more of power tools; electric vehicles including electric vehicles (EV), hybrid electric vehicles (HEV) and plug-in hybrid electric vehicle (PHEV); or systems for power storage.

Hereinafter, the present invention will be described in detail with reference to examples in order to specifically describe the present invention. However, the examples of the present invention may be modified to various other forms and the scope of the present invention shall not be interpreted to be limited to the examples described below. The examples of the present invention are provided in order to more completely describe the present invention for those having average knowledge in the art.

<Preparation of Nanosol>

Preparation Example 1

After dissolving 20 g of zirconium dinitrate dihydrate ($ZrO(NO_3)_2.2H_2O$) and 2.7 g of yttrium nitrate hexahydrate ($Y(NO_3)_3.6H_2O$) in 400 g of ethylene glycol ($C_2H_6O_2$), the resultant was stirred to prepare a mixed solution. The mixed solution was heated for 5 hours at a temperature of 160° C. while stirring, cooled to a temperature of 90° C., and water was introduced thereto to prepare a YSZ nanosol ($Zr_{(1-x)}Y_xO_{2-x/2}$, x value=0.094, weight ratio of Y:Zr in YSZ=9:91) having an average particle diameter ($D_{50}$) of 10 nm.

Preparation Example 2

A CSZ nanosol (CaO content in CSZ=5 mol %, weight ratio of Ca:Zr=2:98) was prepared in the same manner as in Preparation Example 1 except that calcium nitrate tetrahydrate ($Ca(NO_3)_2.4H_2O$) was used in an amount of 0.85 g instead of the yttrium nitrate hexahydrate in Preparation Example 1.

Preparation Example 3

An SSZ nanosol ($(ZrO_2)_{1-2x}(Sc_2O_3)_x$, x value=0.12, weight ratio of Sc:Zr in SSZ=6:94) was prepared in the same manner as in Preparation Example 1 except that scandium nitrate hydrate ($Sc(NO_3)_3.H_2O$) was used in an amount of 2.55 g instead of the yttrium nitrate hexahydrate in Preparation Example 1.

Preparation Example 4

A GDC nanosol ($Gd_{0.1}Ce_{0.9}O_{1.95}$, weight ratio of Gd:Ce in GDC=14:86) was prepared in the same manner as in Preparation Example 1 except that 40 g of cerium nitrate hexahydrate ($Ce(NO_3)_3.6H_2O$) and 6 g of gadolinium nitrate hexahydrate ($Gd(NO_3)_3.6H_2O$) were used instead of the zirconium dinitrate dihydrate and the yttrium nitrate hexahydrate in Preparation Example 1.

Preparation Example 5

An LSGM nanosol ($(La_xSr_{1-x})(Ga_yMg_{1-y})O_3$, x=0.75, y=0.78, weight ratio of La:Sr:Ga:Mg in LSGM=58:12:28:2) was prepared in the same manner as in Preparation Example 1 except that 10 g of lanthanum nitrate hexahydrate ($La(NO_3)_3.6H_2O$), 1.55 g of strontium nitrate ($Sr(NO_3)_2$), 6 g of gallium nitrate hydrate ($Ga(NO_3)_3.H_2O$) and 1.55 g of magnesium nitrate hexahydrate ($Mg(NO_3)_2.6H_2O$) were mixed and used instead of the zirconium dinitrate dihydrate and the yttrium nitrate hexahydrate in Preparation Example 1.

Preparation Example 6

After dispersing 20 g of nickel chloride ($NiCl_2$) into 400 g of an ethylene glycol ($C_2H_6O_2$) solution, the resultant was stirred to prepare a mixed solution. The mixed solution was heated for 5 hours at a temperature of 160° C. while stirring, cooled to a temperature of 90° C., and water was introduced thereto to prepare a Ni nanosol having an average particle diameter ($D_{50}$) of 10 nm.

<Preparation of Positive Electrode Active Material>

Example 1-1

In a batch-type reactor set at 40° C., nickel sulfate, cobalt sulfate and manganese sulfate were each added in water so that a lithium complex metal oxide forming a positive electrode active material has a composition of $LiNi_{0.6}Mn_{0.2}Co_{0.2}O_2$, and an aqueous solution of a transition metal-containing raw material was prepared. Herein, the total concentration of the transition metal-containing raw material was made to be 2 M in the aqueous solution. $NH_4OH$ and NaOH were added to the aqueous solution in a molar ratio of 1:10 so that the aqueous solution has a pH of 12.

To the resultant solution in which particles of transition metal-containing hydroxides are precipitated in the reactor, the YSZ nanosol prepared in Preparation Example 1 was introduced and mixed so that the YSZ nanosol-derived metal element (Y and Zr) content became 0.2% by weight to the total weight of the doped lithium complex metal oxide, and the transition metal-containing hydroxide particles having the YSZ adsorbed on the surface produced as a resultant were separated, flushed, and dried in an oven at 120° C.

After dry mixing the transition metal-containing hydroxide particles having the YSZ adsorbed on the surface prepared above with $LiOH(H_2O)$ as a lithium raw material, the resultant was heat treated at 850° C. to prepare a positive electrode active material (average particle diameter ($D_{50}$): 5 μm) in which a lithium complex metal oxide ($0.998LiNi_{0.6}Mn_{0.2}Co_{0.2} \cdot 0.002Y_{0.09}Zr_{0.91}O_2$) doped with a YSZ ceramic-based ion conductor-derived ceramic element (Y and Zr) was formed on a surface side of $LiNi_{0.6}Mn_{0.2}Co_{0.2}O_2$ particles.

Example 1-2

A positive electrode active material (average particle diameter ($D_{50}$): 5 μm) in which a lithium complex metal oxide ($0.998LiNi_{0.6}Mn_{0.2}Co_{0.2} \cdot 0.002\ Ca_{0.2}Zr_{0.85}O_2$) doped with a CSZ ceramic-based ion conductor-derived ceramic element (Ca and Zr) was formed on a surface side of $LiNi_{0.6}Mn_{0.2}Co_{0.2}O_2$ particles was prepared in the same manner as in Example 1-1 except that the CSZ nanosol prepared in Preparation Example 2 was used instead of the YSZ nanosol prepared in Preparation Example 1.

Example 1-3

A positive electrode active material (average particle diameter ($D_{50}$): 5 μm) in which a lithium complex metal oxide ($0.998LiNi_{0.6}Mn_{0.2}Co_{0.2} \cdot 0.002Sc_{0.09}Zr_{0.91}O_2$) doped with a SSZ ceramic-based ion conductor-derived ceramic element (Sc and Zr) was formed on a surface side of $LiNi_{0.6}Mn_{0.2}Co_{0.2}O_2$ particles was prepared in the same manner as in Example 1-1 except that the SSZ nanosol prepared in Preparation Example 3 was used instead of the YSZ nanosol prepared in Preparation Example 1.

Example 1-4

A positive electrode active material (average particle diameter ($D_{50}$): 5 μm) in which a lithium complex metal oxide ($0.998LiNi_{0.6}Mn_{0.2}Co_{0.2} \cdot 0.002\ Gd_{0.15}Ce_{0.85}O_2$) doped with a GDC ceramic-based ion conductor-derived ceramic element (Gd and Ce) was formed on a surface side of $LiNi_{0.6}Mn_{0.2}Co_{0.2}O_2$ particles was prepared in the same manner as in Example 1-1 except that the GDC nanosol prepared in Preparation Example 4 was used instead of the YSZ nanosol prepared in Preparation Example 1.

Example 1-5

A positive electrode active material (average particle diameter ($D_{50}$): 5 μm) in which a lithium complex metal oxide ($0.998LiNi_{0.6}Mn_{0.2}CO_{0.2} \cdot 0.002La_{0.4}Sr_{0.1}Ga_{0.4}Mg_{0.1}O_2$) doped with a LSGM ceramic-based ion conductor-derived ceramic element (La, Sr, Ga and Mg) was formed on a surface side of $LiNi_{0.6}Mn_{0.2}Co_{0.2}O_2$ particles was prepared in the same manner as in Example 1-1 except that the LSGM nanosol prepared in Preparation Example 5 was used instead of the YSZ nanosol prepared in Preparation Example 1.

Example 1-6

A positive electrode active material (average particle diameter ($D_{50}$): 5 μm) in which a lithium complex metal oxide ($0.998LiNi_{0.62}Mn_{0.2}Co_{0.2} \cdot 0.002Y_{0.09}Zr_{0.91}O_2$) doped with a YSZ ceramic-based ion conductor-derived ceramic element (Y and Zr) and Ni was formed on a surface side of $LiNi_{0.6}Mn_{0.2}Co_{0.2}O_2$ particles was prepared in the same manner as in Example 1-1 except that the Ni nanosol prepared in Preparation Example 6 was additionally mixed and used with the YSZ nanosol so that the Ni nanosol-derived Ni content became 0.2% by weight to the total weight of the doped lithium complex metal oxide.

Comparative Example 1-1

A positive electrode active material (average particle diameter ($D_{50}$): 5 μm) was prepared in the same manner as in Example 1-1 except that the YSZ nanosol was not introduced.

Comparative Example 1-2

In a batch-type reactor set at 40° C., nickel sulfate, cobalt sulfate and manganese sulfate were each added in water so that a lithium transition metal oxide forming a positive electrode active material has a composition of $LiNi_{0.6}Mn_{0.2}Co_{0.2}O_2$, and an aqueous solution of a transition metal-containing raw material was prepared. Herein, the total concentration of the transition metal-containing raw material was made to be 2 M in the aqueous solution. $NH_4OH$ and NaOH were added to the aqueous solution in a molar ratio of 1:10 so that the aqueous solution has a pH of 12. The hydroxide particles were separated, flushed, and dried in an oven at 120° C.

After dry mixing the transition metal-containing hydroxide particles prepared above with $LiOH(H_2O)$ as a lithium raw material and YSZ powder (average particle diameter ($D_{50}$) 50 nm), the resultant was heat treated at 850° C. to prepare a positive electrode active material (average particle diameter ($D_{50}$): 5 μm). Herein, the YSZ powder was used in the content so that the YSZ-derived metal element content became 0.2% by weight to the total weight of the doped lithium transition metal oxide.

Comparative Example 1-3

A positive electrode active material (average particle diameter ($D_{50}$): 5 μm) was prepared in the same manner as in Comparative Example 1-2 except that $NiO_2$ powder was mixed and used with the YSZ powder. Herein, the $NiO_2$ powder was used in the content so that the Ni nanosol-derived Ni content became 0.2% by weight to the total weight of the doped lithium complex metal oxide.

<Manufacture of Lithium Secondary Battery>

Example 2-1

Preparation of Positive Electrode

94% by weight of the positive electrode active material prepared in Example 1-1, 3% by weight of carbon black as a conductor, and 3% by weight of polyvinylidene fluoride (PVdF) as a binder were added to N-methyl-2-pyrrolidone (NMP), a solvent, to prepare positive electrode slurry. The positive electrode slurry was applied on an aluminum (Al) thin film, a positive electrode collector, having a thickness of approximately 20 μm, and the resultant was dried and roll pressed to prepare a positive electrode.

Preparation of Negative Electrode 96.3% by weight of graphite powder as a negative electrode active material, 1.0% by weight of super-p as a conductor, and 1.5% by weight and 1.2% by weight of styrene butadiene rubber (SBR) and carboxymethylcellulose (CMC) as a binder were mixed and added to NMP, a solvent, to prepare negative electrode slurry. The negative electrode slurry was applied on a copper (Cu) thin film, a negative electrode collector, having a thickness of approximately 10 μm, and the resultant was dried and roll pressed to prepare a negative electrode.

Preparation of Non-Aqueous Electrolyte

To a non-aqueous electrolyte solvent prepared by mixing ethylene carbonate and diethyl carbonate in a volume ratio of 30:70 as an electrolyte, $LiPF_6$ was added, and a 1 M $LiPF_6$ non-aqueous electrolyte was prepared.

Manufacture of Lithium Secondary Battery

A cell was manufactured by providing a porous polyethylene separator between the positive electrode and the negative electrode prepared above, and injecting a lithium salt-containing electrolyte thereto.

Examples 2-2 to 2-7

A lithium secondary battery was manufactured in the same manner as in Example 2-1 except that the positive electrode active materials prepared in Examples 1-2 to 1-7 were each used.

Comparative Example 2-1

A lithium secondary battery was manufactured in the same manner as in Example 2-1 except that the positive electrode active material prepared in Comparative Example 1-1 was used.

Comparative Example 2-2

A lithium secondary battery was manufactured in the same manner as in Example 2-1 except that the positive electrode active material prepared in Comparative Example 1-2 was used.

Comparative Example 2-3

A lithium secondary battery was manufactured in the same manner as in Example 2-1 except that the positive electrode active material prepared in Comparative Example 1-3 was used.

Test Example: Nanosol Analysis

The nanosol of the ceramic-based ion conductor prepared in Preparation Example 1 was observed using a transmission electron microscopy (TEM), and an X-ray diffraction analysis (XRD) was performed thereon.

Figure 2:
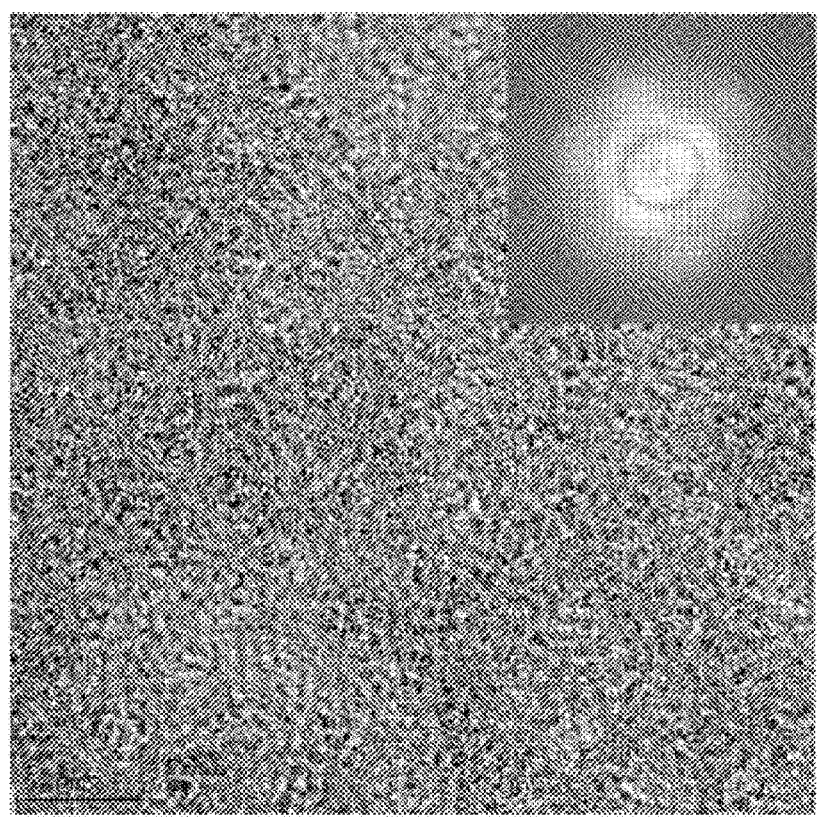
FIG. 2 shows an X-ray diffraction analysis result for a nanosol of a ceramic-based ion conductor prepared in Preparation Example 1.

The results are shown in FIG. 1 and FIG. 2.

As a resultant of the observation, it was identified that YSZ having an average particle diameter ($D_{50}$) of 5 nm or less in the nanosol, and noncrystalline with no crystalline pattern was prepared in a hydroxide form.

Test Example: Analysis on Positive Electrode Active Material

In order to identify distribution of the ceramic-based ion conductor-derived metal element included in the lithium complex metal oxide, the active material prepared in Example 1-1 was etched with argon gas for 0 seconds to 1000 seconds using X-ray photoelectron spectroscopy (XPS), and element detection amounts depending on the etching time were analyzed. The results are shown in the following Table 1.

TABLE 1

| Etching Time (Seconds) | Distance from Particle Surface (nm) | Example 1-1 Y (atom %) | Example 1-1 Zr (atom %) |
|---|---|---|---|
| 0 | 0 | 0.1 | 1 |
| 10 | 1 | 0.09 | 0.8 |
| 30 | 3 | 0.04 | 0.6 |
| 50 | 5 | 0.01 | 0.7 |
| 100 | 10 | 0 | 0.5 |
| 200 | 20 | 0 | 0.2 |
| 300 | 30 | 0 | 0.3 |
| 500 | 50 | 0 | 0.2 |
| 1000 | 100 | 0 | 0 |

In Table 1, Y and Zr content shows the content of Y and Zr based on the total molar amount of the elements included in the lithium complex metal oxide.

Test Example: Electrochemistry Test

<Evaluation on Battery Capacity>

In order to examine a capacity property of the lithium secondary batteries including the positive electrode active materials prepared in Examples 1-1 to 1-6 and Comparative Examples 1-1 to 1-3 (Examples 2-1 to 2-6 and Comparative Examples 2-1 to 2-3), an electrochemistry evaluation test was carried out as follows.

Figure 3:
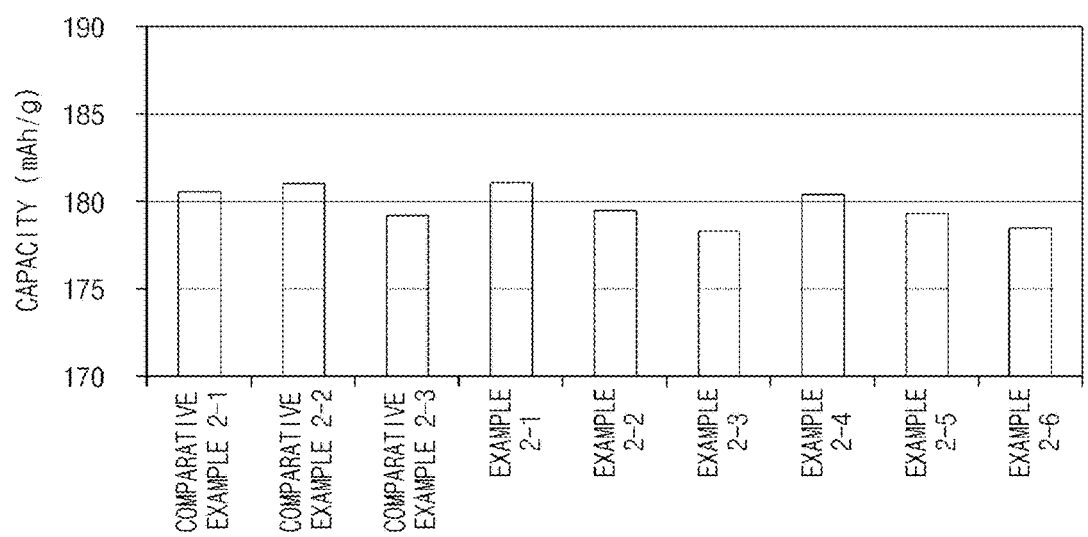
FIG. 3 is a graph showing a capacity property of lithium secondary batteries manufactured in Examples 2-1 to 2-6, and Comparative Examples 2-1 to 2-3.

Specifically, for the capacity evaluation, the lithium secondary batteries manufactured in Examples 2-1 to 2-6 and Comparative Examples 2-1 to 2-3 were charged up to 4.25 V with a constant current (CC) of 0.1 C at 25° C., and after that, charged with a constant voltage (CV) of 4.25 V until a charge current became 0.05 mAh to carry out first charge. After that, the battery was left unattended for 20 minutes, and discharged down to 3.0 V with a constant current of 0.1 C (cut-off was 0.05 C). Discharge capacity was evaluated and compared through the above and the results are shown in FIG. 3.

A capacity property of a battery generally declines when a positive electrode active material is doped. As shown in FIG. 3, the battery of Comparative Example 2-1 including a positive electrode active material of a lithium transition metal oxide that was not doped exhibited the highest capacity property. Meanwhile, the batteries of Examples 2-1 to 2-6 doped using a nanosol-type ceramic-based ion conductor as in the present invention exhibited a slightly declined capacity property compared to Comparative Example 2-1, but exhibited a higher capacity property compared to Comparative Examples 2-2 and 2-3 including a positive electrode active material doped with a dry method using powder. From such results, it can be expected that, by carrying out doping using a nanosol, stability is capable of being secured while minimizing capacity decline of a cell.

<Evaluation on Cycle Property>

In order to examine capacity decline depending on the number of cycles of the lithium secondary batteries including the positive electrode active materials prepared in Examples 1-1 to 1-6 and Comparative Examples 1-1 to 1-3 (Examples 2-1 to 2-6 and Comparative Examples 2-1 to 2-3), an electrochemistry evaluation test was carried out as follows.

Specifically, the lithium secondary batteries manufactured in Examples 2-1 to 2-6 and Comparative Examples 2-1 to 2-3 were charged up to 4.25 V with a constant current (CC) of 0.5 C at 25° C., and after that, charged with a constant voltage (CV) of 4.25 V until a charge current became 0.05 mAh to carry out first charge. After that, the battery was left unattended for 20 minutes, and discharged down to 3.0 V with a constant current of 1 C (cut-off was 0.05 C). This was repeated for a cycle of 1 to 50 times and the results are shown in FIG. 4.

Figure 4:
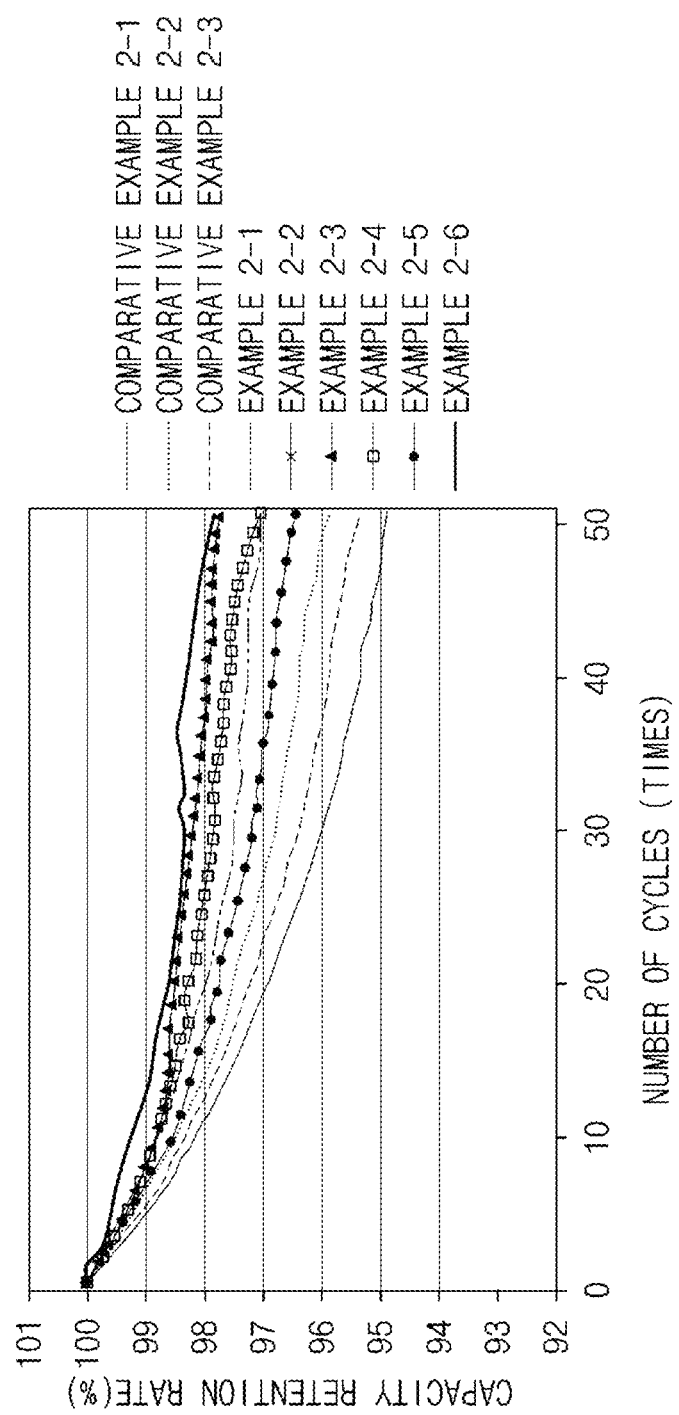
FIG. 4 is a graph showing a cycle property of lithium secondary batteries manufactured in Examples 2-1 to 2-6, and Comparative Examples 2-1 to 2-3.

As shown in FIG. 4, it was identified that the battery of Comparative Example 2-1 including a positive electrode active material of a lithium transition metal oxide that was not doped experienced a greater capacity decline as the number of cycles increased compared to Examples 2-1 to 2-6 and Comparative Examples 2-2 and 2-3 including a positive electrode active material that was doped. From such results, it was identified that a doped positive electrode active material had a reduced capacity decline and thereby had a more superior cycle property compared to a positive electrode active material that was not doped.

In addition, it was identified that the batteries of Examples 2-1 to 2-6 doped using a nanosol-type ceramic-based ion conductor as in the present invention had a reduced capacity decline and thereby had a more superior cycle property compared to Comparative Examples 2-2 and 2-3 including a positive electrode active material doped with a dry method using powder.

From the results described above, it was identified that a positive electrode active material doped using a nanosol-type ceramic-based ion conductor according to the present invention had more improved structural stability, and thereby minimized capacity decline when used in a battery, and as a result, exhibited a more superior cycle property.

What is claimed is:

1. A method for preparing a positive electrode active material comprising:
    mixing a precursor of a metal for a positive electrode active material with a nanosol of a ceramic-based ion conductor to adsorb the nanosol of the ceramic-based ion conductor on the precursor surface; and
    mixing the nanosol of the ceramic-based ion conductor-adsorbed precursor with a lithium raw material, and heat treating the resultant to prepare a positive electrode active material including lithium complex metal oxide particles, wherein the lithium complex metal oxide present on a surface side of the lithium complex metal oxide particles is doped with a metal element of the ceramic-based ion conductor, and
    wherein the nanosol of the ceramic-based ion conductor is prepared by dissolving and reacting a precursor of a metal for forming a ceramic-based ion conductor in a glycol-based solvent, and then adding water thereto,
    the method further comprising a process of heat treatment at a temperature from 120° C. to a boiling point of a glycol-based solvent after dissolving the precursor of the metal for forming a ceramic-based ion conductor and prior to adding water.

2. The method for preparing a positive electrode active material of claim 1, wherein the ceramic-based ion conductor includes any one or a mixture of two or more selected from the group consisting of zirconia-based ceramic, ceria-based ceramic, lanthanum-based ceramic, and cermets thereof.

3. The method for preparing a positive electrode active material of claim 1, wherein the ceramic-based ion conductor includes any one or a mixture of two or more selected from the group consisting of yttria-stabilized zirconia, gadolinia-doped ceria, lanthanum strontium gallate magnesite, lanthanum strontium manganite, calcia-stabilized zirconia, scandia-stabilized zirconia, and nickel-yttria-stabilized zirconia cermet.

4. The method for preparing a positive electrode active material of claim 1, wherein the ceramic-based ion conductor includes any one or a mixture of two or more selected from the group consisting of yttria-stabilized zirconia, calcia-stabilized zirconia, gadolinia-doped ceria, lanthanum strontium gallate magnesite and scandia-stabilized zirconia.

5. The method for preparing a positive electrode active material of claim 4, wherein the yttria-stabilized zirconia is $Zr_{(1-x)}Y_xO_{2-x/2}$ (0.01≤x≤0.30).

6. The method for preparing a positive electrode active material of claim 4, wherein the calcia-stabilized zirconia includes CaO in 1 mol % to 20 mol % to the total weight of the calcia-stabilized zirconia.

7. The method for preparing a positive electrode active material of claim 4, wherein the scandia-stabilized zirconia includes any one or a mixture of two or more selected from the group consisting of $(ZrO_2)_{1-2x}(Sc_2O_3)_x$, $(ZrO_2)_{1-2x}(Sc_2O_3)_{x-z}(Y_2O_3)_z$ and $(ZrO_2)_{1-2x-z}(Sc_2O_3)_x(CeO_2)_z$ (0.01≤x≤0.2 and 0.01≤z≤0.1).

8. The method for preparing a positive electrode active material of claim 1, wherein the ceramic-based ion conductor is noncrystalline.

9. The method for preparing a positive electrode active material of claim 1, wherein the ceramic-based ion conductor has a hydroxide form.

10. The method for preparing a positive electrode active material of claim 1, wherein the ceramic-based ion conductor has an average particle diameter ($D_{50}$) of 1 nm to 100 nm.

11. The method for preparing a positive electrode active material of claim 1, further comprising adding a nanosol including any one, two or more metals selected from the group consisting of aluminum (Al), niobium (Nb), titanium (Ti), tungsten (W), molybdenum (Mo), chromium (Cr), copper (Cu), vanadium (V) and zinc (Zn) when mixing the precursor of the metal for a positive electrode active material and the nanosol of the ceramic-based ion conductor.

12. The method for preparing a positive electrode active material of claim 1, wherein the precursor of the metal for a positive electrode active material is a hydroxide of nickel cobalt manganese including Ni, Co and Mn.

13. The method for preparing a positive electrode active material of claim 1, wherein the heat treatment is carried out in a temperature range of 700° C. to 950° C.

14. A positive electrode active material prepared using the preparation method of mixing a precursor of a metal for a positive electrode active material with a nanosol of a ceramic-based ion conductor to adsorb the nanosol of the ceramic-based ion conductor on the precursor surface, and mixing the nanosol of the ceramic-based ion conductor-adsorbed precursor with a lithium raw material, and heat treating the resultant to prepare a positive electrode active material including lithium complex metal oxide particles, wherein the lithium complex metal oxide present on a surface side of the lithium complex metal oxide particles is doped with a metal element of the ceramic-based ion conductor, comprising lithium complex metal oxide particles, wherein the lithium complex metal oxide present on a surface side of the lithium complex metal oxide particles is doped with a metal element of a ceramic-based ion conductor and, wherein the lithium complex metal oxide doped with the metal element of the ceramic-based ion conductor comprises a compound of the following Chemical Formula 1:

$$ALi_{1+a}Ni_{1-b-c}Mn_bCo_c(1-A)M'_sM''_yO_2$$ <Chemical Formula 1> wherein, in Chemical Formula 1,

M' comprises any one or a mixed element of two or more types selected from the group consisting of Y, Zr, La, Sr, Ga, Mg, Sc, Gd, Sm, Ca, Ce, Co, Mn and Fe;

M" comprises any one or a mixed element of two or more types selected from the group consisting of Al, Nb, Ti, W, Mo, Cr, Cu, V and Zn; and $0<A<1$, $0\leq a\leq 0.33$, $0\leq b\leq 0.5$, $0\leq c\leq 0.5$, $0<s\leq 0.2$ and $0\leq v\leq 0.2$.

15. The positive electrode active material of claim 14, wherein the metal element of the ceramic-based ion conductor is distributed in a region corresponding to a distance of 0% to 30% from the particle surface to a radius of the lithium complex metal oxide particles.

16. The positive electrode active material of claim 14, wherein, in Chemical Formula 1, M' and M" are each independently distributed in a concentration gradient gradually decreasing from a surface to a center of a particle of the lithium complex metal oxide.

17. A positive electrode comprising the positive electrode active material of claim 14.

* * * * *